Patented June 22, 1948

2,443,716

UNITED STATES PATENT OFFICE 2,443,716

SURFACE-ACTIVE NITROSATION-SULFITATION PRODUCTS

Leland James Beckham, Geddes, and William Alfred Fessler, Camillus, N. Y., assignors to Allied Chemical & Dye Corporation, a corporation of New York No Drawing. Application September 24, 1943, Serial No. 503,652

10 Claims. (Cl. 260—513)

This invention relates to salts of organic sulfonates which are useful as surface active agents, e. g., as detergents, wetting agents, dispersing agents, emulsifying agents, and the like. The invention relates particularly to organic sulfonates of the type referred to herein as nitrosation-sulfitation products, in the form of salts of a specific class, and to a process for their preparation.

In United States Patent 2,265,993 of December 18, 1941, to L. J. Beckham, a process is described for the production of surface-active compositions by forming an addition product of a nitrosyl halide, specifically nitrosyl chloride or nitrosyl bromide, with unsaturated aliphatic compounds or mixtures thereof and reacting the resulting addition products with a water-soluble sulfite in aqueous solution. The compositions obtained by this process comprise water-soluble mixtures of sulfonated ketones, sulfonated amines, sulfonated alkylidene sulfamates, sulfonated alkyl sulfamates and bisulfite addition products of sulfonated alkylidene sulfamates. In United States Patent No. 2,336,387 of December 7, 1943, to Leland J. Beckham, entitled "Derivatives of unsaturated compounds and method of making," the manufacture is described of certain surface-active compositions of said type from carboxyl-substituted unsaturated hydrocarbons and mixtures thereof. And in United States Patent 2,313,719 of March 16, 1943, to L. J. Beckham, a process is described for the production of surface-active compositions by a sulfitation procedure similar to that described in the above-mentioned patent and application, from addition products of organic compounds containing a non-aromatic

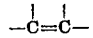

linkage with nitrogen oxides, particularly nitrogen tetroxide and nitrogen trioxide.

The water-soluble mixtures obtained according to the aforesaid patents are herein designated as "nitrosation-sulfitation products," and the intermediate addition products which are subjected to sulfitation, for example, by reaction with a water-soluble sulfite in aqueous solution, are designated as "nitrosation products." The term "nitrosating agent" is used herein to designate a member of the group consisting of NOCl, NOBr, N₂O₄, N₂O₃ and mixtures of two or more thereof, which are employed according to the aforesaid patents for the preparation of the intermediate nitrosation products which are subjected to sulfitation.

The salts of the specific class to which this invention relates are salts of organic nitrogen bases with mixtures of acids corresponding to organic anions of said nitrosation-sulfitation products, and especially to the organic anions of the nitrosation-sulfitation products of the aforesaid Beckham patents.

We have discovered that the said salts of organic nitrogen bases are characterized by unusually good solubility in many organic water-immiscible solvents, as compared with the corresponding alkali metal and ammonium salts, and that they possess, at the same time, valuable surface-active properties, such as good foaming power in aqueous solution. For example, we have found that butylamine salts of acids corresponding to the organic anions of the nitrosation-sulfitation products derived from mixtures of olefin hydrocarbons having a carbon content which lies within the range 10 to 30 carbon atoms are not only excellent water-soluble surface-active materials, but are unusually soluble in a number of organic water-immiscible solvents (including aromatic liquids, such as benzene, toluene or ortho-dichlor benzene; and chlorinated lower molecular weight aliphatic hydrocarbons, such as carbon tetrachloride, chloroform and trichlorethylene), as well as in water-miscible solvents, such as alcohol. When dissolved in the aforesaid water-immiscible solvents, they have the power to disperse water therein, forming stable water-in-oil emulsions. By virtue of this property, the organic nitrogen base salt compositions of our invention are valuable adjuvants for dry-cleaning solutions employing water-immiscible solvents, especially of the aforesaid type, particularly when water is added in small amounts to such solutions to facilitate removal of water-soluble soil. The aforesaid nitrogen base salts maintain the water in dispersion so that the fabrics to be cleaned are not wetted thereby.

The compositions of the present invention may be prepared by a number of processes. For instance, nitrosation-sulfitation products of the aforesaid Beckham patents, prepared by reaction of nitrosation products with an alkali metal- or ammonium sulfite in aqueous solution, may be reacted with a strong mineral acid to liberate the organic acids thereof. These acids may be separated from the inorganic components of the mixture, and neutralized with an organic nitrogen base, particularly of the classes hereinafter more fully described.

We have discovered, however, that the organic nitrogen base salts of this invention can be more advantageously prepared by reacting the aforesaid nitrosation products directly with aqueous solutions of water-soluble sulfites of the organic nitrogen bases, e. g., under sulfitation reaction conditions analogous to those employed in the preparation of the corresponding alkali metal or ammonium sulfonate compositions. The mixtures obtained in this manner often appear to differ in chemical composition from the corresponding mixtures obtained as indicated above by liberation of the corresponding acids and subsequent neutralization with the organic nitrogen base.

For example, treatment of an aqueous solution of an alkali metal or ammonium salt of a nitrosation-sulfitation product with a strong acid to liberate the acids corresponding to the organic anions of the nitrosation-sulfitation product tends to hydrolyze some of the sulfamate groups of the components, and to split off some of the water-solubilizing groups formed, during sulfitation, by addition of bisulfite to carbon-nitrogen double bonds. As a result, small amounts of the organic components are transformed into water-insoluble oils, and the solubility of components in water is reduced. This effect is avoided when organic nitrogen base salts are prepared directly from nitrosation products by reaction of the latter with an aqueous solution of a sulfite of the organic nitrogen base. Moreover, in the latter procedure, as distinguished from the former, the organic nitrogen base tends to react to some extent as such with the nitrosation product, e. g., to form quaternary ammonium salts. While these are relatively less soluble in water than the nitrosation sulfitation products, they generally possess cationic surface activity and enhance the surface activity of the composition obtained. Accordingly, the direct procedure for preparing organic nitrogen base derivatives of nitrosation-sulfitation products, and the products obtained by this method are preferred.

The organic nitrogen bases serving as intermediates for the surface-active salt compositions of this invention are preferably soluble in water, i. e., soluble to the extent of forming at least 10% (by weight) aqueous solutions at a temperature of 25° C. Thus, the preferred organic nitrogen bases include particularly: lower alkyl primary, secondary and tertiary amines containing 1 to 5 carbon atoms, such as methylamine, butylamines diethylamine, and trimethylamine; aralkyl primary amines, such as benzylamine; primary, secondary, and tertiary alkylol-amines such as monoethanolamine, diethanolamine, triethanolamine, and commercial mixtures thereof; and mono-nuclear heterocyclic nitrogen bases, such as pyridine and piperidine. Of the foregoing, the butylamines are especially preferred as the salt-forming organic nitrogen bases for preparing the products of this invention because of the exceptionally high solubility of the resulting products in organic water-immiscible solvents of the classes above indicated, and their excellent surface-activity in aqueous solution.

The unsaturated organic compounds employed as intermediates for the nitrosation products, from which the organic nitrogen base salts of this invention are derived, include the classes of compounds disclosed in the above-mentioned Beckham Patents 2,265,993, 2,313,719 and 2,336,387. Thus, they include organic compounds having 10 to 30 carbon atoms and having at least one non-aromatic

linkage. More particularly they include olefin hydrocarbons as well as carboxyl derivatives thereof, comprising free carboxylic acids, their esters, salts, amides, chlorides, and the corresponding nitriles. Starting materials especially adapted for the manufacture of products destined for use as detergents, wetting and emulsifying agents, and the like are compounds having 10 to 30 carbon atoms per ethylenic linkage, of which at least 8 of the carbon atoms are disposed in a continuous carbon chain. Of the olefin hydrocarbons, mono-olefins having a carbon content which lies within the range 12 to 23 carbon atoms are especially suitable for the manufacture of cleansing agents. (It is to be understood that, where ranges are given herein, they include the limits.) The olefins at the lower end of this range excel in wetting and foaming power, the intermediate members excel as low temperature washing agents, and the higher olefin derivatives excel as high temperature washing agents. The use of mixtures comprising olefins of different chain length within the aforesaid range is advantageous; the presence, in a single surface-active composition, of various compounds primarily suitable respectively as wetting agents, as foaming agents, and as dispersing agents results in optimum cleaning power, since wetting is accelerated, the soil is retained in suspension, and cleansing is expedited.

The unsaturated organic compounds serving as raw materials may be straight-chain compounds, or secondary or tertiary branched-chain compounds. They may contain one or more, especially one to two, non-aromatic

linkages per molecule. The double bonds may be located at terminal or intermediate positions in the carbon chains. The most valuble compounds for detergent purposes are obtained from olefins and carboxyl-substituted olefins containing an olefinic linkage at the end of a carbon chain of at least 8 carbon atoms.

The source of the unsaturated organic compounds may be animal, vegetable, or mineral. Thus suitable olefins may be prepared by dehydrating alcohols obtained by hydrogenation of naturally occurring fats and oils (such as tallow, palm oil, cocoanut oil, olive oil), or the corresponding free acids. Or the olefins may be prepared by the Fischer-Tropsch synthesis, or by cracking waxes, or by cracking or dehydrogenating natural or synthetic (Fischer-Tropsch) petroleum or petroleum fractions, or by halogenating and then dehydrohalogenating such materials, or by polmerizing low molecular weight olefins.

Olefinic mixtures containing olefins and saturated hydrocarbons, derived from natural or synthetic (Fischer-Tropsch) petroleum directly or by thermolytic treatments thereof, constitute highly satisfactory initial materials for use in accordance with the present invention. Thermolytic treatments which have been found to yield large proportions of the desired olfins are catalytic and non-catalytic cracking, catalytic dehydrogenation, and combinations thereof. The preferred olefinic mixtures, comprising for the most part hydrocarbons having 10 to 30 carbon atoms per molecule, may be segregated from less desirable products of the treatment by fractional distillation. Since paraffinic, aromatic, or saturated alicyclic hydrocarbons or other relatively inert diluent liquids, especially liquids which are solvents for the olefin or olefins being reacted, may be present during formation of the nitrosation products, non-olefinic hydrocarbons present in such thermolytic-processed petroleum distillate fractions may be permitted to remain, and may be separated after the sulfitation treatment as water-insoluble oils. The petroleum may be fractionally distilled prior to the thermolytic treatment, to provide an oil containing an increased proportion of the hydrocarbons containing 10 and more carbon atoms per molecule. Saturated aromatic constituents, to the extent they are acted upon by the nitrosating agents, form active products which may be converted by aqueous sulfites and bisulfites to water-soluble surface-active products.

Examples of suitable olefins are cetene (derived from spermaceti and comprising for the most part cetene-1), 2-methyl-pentadecene-2, dodecene-1, pentadecene-7, tricosene-11, nondecene-9, 10-methyl nondecene-9, and olefin-containing $C_{16}$—$C_{23}$ mixtures obtained by cracking topped, crude, natural or synthetic petroleum or by dehydrogenating a petroleum distillate (such as, gas oil) or by reacting carbon monoxide and hydrogen in the presence of a catalyst such as cobalt (the Fischer-Tropsch synthesis). Some synthetic petroleums contain relatively high proportions of olefins as compared with natural petroleum and hence are more suitable for use without a concentration or thermolysis to increase the olefin content.

Suitable substituted olefins are esters of unsaturated fatty acids (such as, acrylic acid and oleic acid), mono- and di-esters of maleic acid, or mixtures such as the alkenyl succinic acid esters obtained by condensation of maleic anhydride with olefin fractions obtained by cracking or dehydrogenating natural or synthetic petroleum or by catalytic processes (such as the Fischer-Tropsch synthesis) and esterification of the unsaturated dicarboxylic acid anhydrides formed, with saturated mono-, di-, or trihydroxy alcohols (such as methanol, ethanol, propanol, isopropanol, the butanols and pentanols, glycol and glycerin and their homologs, lauryl alcohol, myristyl alcohol and cetyl alcohol); the esters of saturated fatty acids (such as acetic, lauric and stearic acids) with unsaturated alcohols (such as allyl alcohol and its homologs); the mono-esters and the symmetrical and unsymmetrical di-esters of succinic acid with unsaturated alcohols, or with an unsaturated alcohol on the one hand and a saturated alcohol on the other; the free oleic and alkenyl succinic acids and their alkali-metal salts and acid chlorides; the amides of saturated fatty acids and unsaturated amines; the amides of unsaturated fatty acids and amines (e. g., dimethyl amine, methyl butyl amine, ethyl butyl amine, etc.); and unsaturated ketones.

Specific examples of substituted olefins are butyl oleate, oleic acid, methyl oleate, isopropyl oleate, allyl stearate, allyl laurate, the di-n-octyl ester of octenyl (or nonenyl, decenyl, or undecenyl)-succinic acid, oleic acid amide, N-methyl oleic acid amide, N-dimethyl oleic acid amide, oleic acid anhydride, oleic acid chloride, oleic acid nitrile, N-allyl lauric acid amide, N-oleyl butyric acid amide, N-methyl N-oleyl propionic acid amide, N-ethyl N-oleyl acetic acid amide, N-methyl N-lauryl 4-hexenoic acid amide, N-decyl 3-pentenoic acid amide, 3-methyl-4-dimethyl-cyclopentane-1-carboxylic acid ester of allyl alcohol, and oleone.

Examples of suitable unsaturated ring compounds are N-lauryl cyclohexene and $\Delta^2$-3-methyl-4-dimethyl-cyclopentene-1-carboxylic acid ester of butanol-1.

When olefinic petroleum hydrocarbons are employed which contain color-forming constituents, the color of the final nitrosation-sulfitation products prepared therefrom can be materially improved by preliminary selective extraction with a polar solvent, such as furfural, which is partly miscible with the petroleum hydrocarbon mixture, as disclosed in our application Serial No. 505,960, filed October 12, 1943. In preparing the nitrosation products, it is advantageous, as disclosed in application Serial No. 427,345, filed January 19, 1942, of H. A. Beekhuis, Jr., now Patent No. 2,370,518, issued February 27, 1945, to employ as a nitrosating agent, nitrosyl chloride containing minor proportions of nitrogen tetroxide.

In carrying out the sulfitation according to this invention, the nitrosation product is reacted with an aqueous solution of a sulfite of an organic nitrogen base prepared, for instance, by treatment of said nitrogen base in aqueous solution or suspension with sulfur dioxide at a temperature and pressure favoring formation of a sulfite, preferably at temperatures from 0° to 50° C. at atmospheric pressure. At higher temperatures the reaction mixture is preferably maintained under superatmospheric pressure to offset dissociation of the nitrogen base sulfite. The amount of sulfur dioxide preferably employed is at least sufficient to form the neutral sulfite and, if desired, an additional quantity may be added to form a bisulfite. Preferably the proportion of sulfur dioxide to the organic nitrogen base is such as to form a mixture of normal sulfite and bisulfite in a molecular ratio of about 5:1. For purposes of the present invention it is assumed that the sulfur dioxide and organic nitrogen base react in aqueous solution to form a sulfite or bisulfite (or mixture of both) of the organic nitrogen base. Whether or not such compounds are actually formed is not material to the present invention, since the reaction of the nitrosation products with the aqueous solutions result in sulfitation products in the form of salts of the organic nitrogen bases. Accordingly, it will be understood that, where in the specification and claims a sulfite of an organic nitrogen base is referred to, aqueous solutions containing sulfur dioxide and the organic nitrogen base in solution, as such or in the form of an organic nitrogen base sulfite, are included.

The nitrosation product is mixed with the aqueous sulfite solution in proportions such that the mol ratio of the total sulfite (including bisulfite) to the molecular equivalent of olefin which has reacted with the nitrosating agent in the nitrosation treatment is about 1:1 to about 5:1 and preferably 3:1 to 4:1. The sulfitation reaction can be promoted by addition of an organic water-miscible solvent to the mixture, particularly an alcohol such as isopropyl alcohol.

The sulfitation mixture is heated to a reaction temperature of 65° to 130° C. and the reaction is permitted to continue for a period of about ½ to about 20 hours, or until the reaction is substantially complete. Preferably the temperature of the mixture is initially maintained between 0° and 50° C., then gradually raised, and the reaction completed at a temperature of 65° to 130° C.

After the sulfitation is complete, unreacted hydrocarbons may be separated from the mixture by stratification, followed by extraction with a low-boiling hydrocarbon solvent in which the nitrosation-sulfitation products are relatively insoluble, for example, petroleum naphtha or heptane. The residual extractant and the organic water-miscible solvent if employed, may be separated from the aqueous solution by stripping the latter with a current of hot vapor as disclosed in copending application Serial No. 427,321 of January 19, 1942, now Patent No. 2,383,120, issued August 21, 1945.

The resulting aqueous solution containing the nitrosation-sulfitation products, together with inorganic acid salts of the organic nitrogen base, may be evaporated to dryness on a drum drier or by spray-drying, the inorganic acid salts in this case remaining in the dried product. However, if it is desired to provide compositions suitable as adjuvants for dry cleaning solvents, it is preferable to extract the solution with an organic water-immiscible solvent in which the organic nitrogen base sulfonates are relatively soluble, for instance a chlorinated low molecular weight hydrocarbon (such as carbon tetrachloride, chloroform or trichlorethylene), or an aromatic liquid (such as benzene, toluene or ortho-dichlor benzene). The organic solvent may be completely evaporated from the resulting non-aqueous extract containing the organic nitrogen base sulfonates, and the residue employed as an adjuvant for dry cleaning solvents; or the extract may be concentrated to yield a solution of the organic nitrogen base sulfonates in residual solvent, such solutions being especially suitable for direct addition to dry cleaning compositions. The butylamine salts of the nitrosation-sulfitation products are particularly well adapted for dry-cleaning operations because of their relatively superior solubility in dry-cleaning solvents. Like the other compositions within the scope of this invention, the said butylamine salts are also suitable for use as wetting and foaming agents in aqueous solutions.

The following example, wherein temperatures are in degrees centigrade and parts are by weight, illustrates the preferred process according to the invention.

*Example, Part 1.*—93.6 parts of an olefin-containing hydrocarbon mixture (obtained by extracting, with ethylene glycol monomethyl ether, a fraction of cracked Pennsylvania cylinder stock of which the components have an average of 14 to 23 carbon atoms) were charged to a nitrosator, and 28.75 parts of nitrosyl chloride were introduced into the hydrocarbon mixture while maintaining the temperature at 25°. The introduction of nitrosyl chloride was carried out at a rate of 5.75 parts per hour for 5 hours. Air was then blown into the resulting reaction mixture to remove residual nitrosyl chloride, and the mobile liquid was decanted from a gum residue weighing 2.5 parts. The resulting oil, which was green in color, weighed 114.4 parts.

*Part 2.*—51.2 parts of n-butylamine were dissolved in 102.7 parts of water. While the temperature was kept at 20°, SO$_2$ was passed into the resulting solution until the pH of the solution was 6.5. The resulting solution was a clear colorless liquid containing the n-butylamine salt of sulfurous acid. 56.1 parts of the nitrosation product of part 1 were added to the n-butylamine bisulfite solution, and the resulting mixture was gradually heated to 90° while stirring vigorously. After cooling, the resulting reaction mixture was extracted with 5 portions of petroleum naphtha, each portion weighing about 35 parts. 160 parts of benzene were then added to the remaining aqueous mixture and, after agitating to obtain thorough mixing, the mixture was allowed to settle. The upper layer containing a benzene extract of the nitrosation-sulfitation product in the form of the n-butylamine salt was separated from the lower aqueous layer containing n-butyl ammonium chloride, sulfite, sulfate, etc. The aqueous layer was again extracted with additional benzene (80 parts) and the benzene extracts were combined. The resulting benzene solution was washed with 25 parts of water and was then subjected to evaporation on a steam bath, whereby most of the benzene was removed. The residual benzene was removed by heating the remaining liquid at 50° under vacuum (5 mm. of mercury absolute pressure). There remained a residue of 42.8 parts of a clear brown-red liquid of very high viscosity, which dissolved slowly in water to form solutions having excellent foaming ability, which dissolved readily in aromatic hydrocarbons and chlorinated hydrocarbons (such as benzene, chloroform, trichlorethylene and carbon tetrachloride), and which dissolved less readily in petroleum hydrocarbon solvents, such as Stoddard solvent.

Variations and modifications in the foregoing example, may be made within the scope of the invention, and accordingly the details thereof are to be interpreted in an illustrative rather than in a limiting sense.

Thus, in the process of the above example, the aqueous portion of the sulfitation mixture may be evaporated to dryness, after removal of unreacted water-insoluble oils by extraction with petroleum naphtha, instead of first separating the amine salt of the nitrosated-sulfitated product by extraction from the amine salts of inorganic acids formed as by-products.

In preparing a nitrosation product for use in connection with the present invention, the reaction conditions of part 1 of the foregoing example can be varied in accordance with the disclosures of U. S. Patents 2,265,993 and 2,336,387. For example, temperatures of —20° to 80° C. can be employed and the amount of nitrosyl chloride is preferably from about 1 to about 2 mols per non-aromatic

linkage, i. e., per molecular equivalent of mono-olefin contained in the hydrocarbon mixture. An equivalent amount of nitrosyl bromide may replace the nitrosyl chloride, or the nitrosyl halides can be employed in admixture with nitrogen tetroxide or nitrogen trioxide. Suitable nitrosation products can also be prepared in accordance with U. S. Patent 2,313,719 of March 16, 1943, employing nitrogen tetroxide or nitrogen trioxide or a mixture thereof, as the nitrosating agent, at nitrosation temperatures of —20° to 80° C., the amount of nitrosating agent preferably being from 1 to 2 mols per non-aromatic

linkage.

We claim:

1. A surface-active composition which comprises organic nitrogen base salts of a mixture of acids having carbon contents within the range 10 to 30 carbon atoms, said mixture of acids including sulfonated ketones, sulfonated amines, sulfonated alkylidene sulfamates, sulfonated alkyl sulfamates and bisulfite addition products of sulfonated alkylidene sulfamates, and being derived from an unsaturated organic compound having at least one non-aromatic

linkage and a carbon content within the range 10 to 30 carbon atoms, by a process involving reaction of a nitrosating agent of the class consisting of NOCl, NOBr, N₂O₄ and N₂O₃ with a non-aromatic

linkage of said unsaturated organic compound and reaction of the resulting nitrosation product with a water-soluble sulfite of an organic nitrogen base in aqueous solution.

2. A surface-active composition which comprises organic nitrogen base salts of a mixture of open-chain sulfonic acids having an average carbon content within the range 10 to 30 carbon atoms, said organic nitrogen base being water-soluble, and said mixture of acids including sulfonated alkyl ketones, sulfonated alkyl amines, sulfonated alkylidene sulfamates, sulfonated alkyl sulfamates and bisulfite addition products of sulfonated alkylidene sulfamates, and being derived from a mixture of olefin hydrocarbons obtained from petroleum and having an average carbon content within the range 10 to 30 carbon atoms, by a process involving reaction of a nitrosating agent of the class consisting of NOCl, NOBr, N₂O₄ and N₂O₃ with said mixture of olefin hydrocarbons and reaction of the resulting nitrosation product with a water-soluble sulfite of a water-soluble organic nitrogen base in aqueous solution.

3. A surface-active composition which comprises organic nitrogen base salts of a mixture of open-chain sulfonic acids having carbon contents within the range 12 to 23 carbon atoms, said organic nitrogen base being water-soluble, and said mixture of acids including sulfonated alkyl ketones, sulfonated alkyl amines, sulfonated alkylidene sulfamates, sulfonated alkyl sulfamates and bisulfite addition products of sulfonated alkylidene sulfamates, and being derived from an olefin hydrocarbon the carbon content of which lies within the range 12 to 23 carbon atoms, by a process involving reaction of a nitrosating agent of the class consisting of NOCl, NOBr, N₂O₄ and N₂O₃ with said olefin hydrocarbon and reaction of the resulting nitrosation product with a water-soluble sulfite of a water-soluble organic nitrogen base in aqueous solution.

4. A surface-active composition which comprises alkyl amine salts of a mixture of open-chain sulfonic acids having carbon contents within the range 10 to 30 carbon atoms, said alkyl amine having 1 to 5 carbon atoms, and said mixture of acids including sulfonated alkyl ketones, sulfonated alkyl amines, sulfonated alkylidene sulfamates, sulfonated alkyl sulfamates and bisulfite addition products of sulfonated alkylidene sulfamates, and being derived from an olefin hydrocarbon the carbon content of which lies within the range 10 to 30 carbon atoms, by a process involving reaction of a nitrosating agent of the class consisting of NOCl, NOBr, N₂O₄ and N₂O₃ with said olefin hydrocarbon and reaction of the resulting nitrosation product with an aqueous solution of a sulfite of said alkyl amine.

5. A surface-active composition which comprises butylamine salts of a mixture of sulfonic acids having carbon contents within the range 10 to 30 carbon atoms, said mixture of sulfonic acids including sulfonated ketones, sulfonated amines, sulfonated alkylidene sulfamates, sulfonated alkyl sulfamates and bisulfite addition products of sulfonated alkylidene sulfamates, and being derived from an unsaturated organic compound having at least one non-aromatic

linkage and a carbon content which lies within the range 10 to 30 carbon atoms by a process involving reaction of a nitrosating agent of the class consisting of NOCl, NOBr, N₂O₄ and N₂O₃ with a non-aromatic

linkage of said unsaturated organic compound and reaction of the resulting nitrosation product with a butyl amine sulfite in aqueous solution.

6. A surface-active composition which comprises butylamine salts of a mixture of open-chain sulfonic acids having an average carbon content within the range 12 to 23 carbon atoms, said mixture of acids including sulfonated alkyl ketones, sulfonated alkyl amines, sulfonated alkylidene sulfamates, sulfonated alkyl sulfamates and bisulfite addition products of sulfonated alkylidene sulfamates, and being derived from a mixture of olefin hydrocarbons obtained from petroleum and having an average carbon content within the range 12 to 23 carbon atoms, by a process involving reaction of a nitrosating agent of the class consisting of NOCl, NOBr, N₂O₄ and N₂O₃ with said mixture of olefin hydrocarbons and reaction of the resulting nitrosation product with a butyl amine sulfite in aqueous solution.

7. In the process for the preparation of a surface-active composition by the sulfitation of a nitrosation product obtained by reaction of a nitrosating agent of the class consisting of NOCl, NOBr, N₂O₄ and N₂O₃ with a non-aromatic

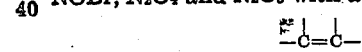

linkage of an unsaturated organic compound having at least one non-aromatic

linkage and a carbon content which lies within the range 10 to 30 carbon atoms, the improvement which comprises reacting the nitrosation product with an aqueous solution of a water-soluble sulfite of an organic nitrogen base.

8. A surface-active composition which comprises salts of a water-soluble organic nitrogen base with a mixture of sulfonic acids corresponding to organic anions of a nitrosation-sulfitation product of an olefin hydrocarbon, said acids including sulfonated ketones, sulfonated amines, sulfonated alkylidene sulfamates, sulfonated alkyl sulfamates and bisulfite addition products of sulfonated alkylidene sulfamates, said composition being obtained by reacting an addition product, obtained by reaction of a nitrosating agent of the class consisting of NOCl, NOBr, N₂O₄ and N₂O₃ with an olefin hydrocarbon the carbon content of which lies within the range 10 to 30 carbon atoms, with a water-soluble sulfite of a water-soluble organic nitrogen base in aqueous solution.

9. A process for the preparation of a surface-active composition which comprises reacting an addition product, obtained by reaction of a nitrosating agent of the class consisting of NOCl, NOBr, N₂O₄ and N₂O₃ with an olefin hydrocarbon the carbon content of which lies within the range 10 to 30 carbon atoms, with a sulfite of an alkyl amine containing 1 to 5 carbon atoms, in aqueous solution, at a temperature of 0° to 130° C.

10. A surface-active composition which comprises salts of butylamine with a mixture of sulfonic acids corresponding to organic anions of a nitrosation-sulfitation product of a mixture of olefin hydrocarbons obtained from petroleum, said acids including sulfonated ketones, sulfonated amines, sulfonated alkylidene sulfamates, sulfonated alkyl sulfamates and bisulfite addition products of sulfonated alkylidene sulfamates, said composition being obtained by reacting an addition product, obtained by reaction of a nitrosating agent of the class consisting of NOCl, NOBr, $N_2O_4$ and $N_2O_3$ with a mixture of olefin hydrocarbons obtained from petroleum, the olefins of said mixture having an average carbon content within the range 12 to 23 carbon atoms, with a water-soluble sulfite of butylamine, in aqueous solution, at a temperature of 0° to 130° C.

LELAND JAMES BECKHAM.
WILLIAM ALFRED FESSLER.

REFERENCES CITED

The following references are of record in the file of this patent:

UNITED STATES PATENTS

| Number | Name | Date |
|---|---|---|
| 1,842,626 | Ossenbeck | Jan. 26, 1932 |
| 2,061,601 | Steik | Nov. 24, 1936 |
| 2,130,668 | Gunther | Sept. 20, 1938 |
| 2,265,993 | Beckham | Dec. 16, 1941 |
| 2,313,719 | Beckham | Mar. 16, 1943 |
| 2,336,387 | Beckham | Dec. 7, 1943 |
| 2,343,362 | Beckham | Mar. 7, 1944 |
| 2,354,359 | Beckham | July 25, 1944 |